US011969012B2

(12) United States Patent
Lee et al.

(10) Patent No.: US 11,969,012 B2
(45) Date of Patent: Apr. 30, 2024

(54) AEROSOL-GENERATING DEVICE FOR GENERATING AEROSOL THROUGH MICROWAVES AND METHOD THEREOF

(71) Applicant: KT&G CORPORATION, Daejeon (KR)

(72) Inventors: Jae Min Lee, Siheung-si (KR); Sang Kyu Park, Hwaseong-si (KR)

(73) Assignee: KT&G CORPORATION, Daejeon (KR)

( * ) Notice: Subject to any disclaimer, the term of this patent is extended or adjusted under 35 U.S.C. 154(b) by 729 days.

(21) Appl. No.: 17/057,887

(22) PCT Filed: May 20, 2020

(86) PCT No.: PCT/KR2020/006584
§ 371 (c)(1),
(2) Date: Nov. 23, 2020

(87) PCT Pub. No.: WO2020/256292
PCT Pub. Date: Dec. 24, 2020

(65) Prior Publication Data

US 2022/0132927 A1 May 5, 2022

(30) Foreign Application Priority Data

Jun. 18, 2019 (KR) ........................ 10-2019-0072430

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/53* (2020.01); *A24F 40/57* (2020.01);
(Continued)

(58) Field of Classification Search
None
See application file for complete search history.

(56) References Cited

U.S. PATENT DOCUMENTS 6,384,392 B1 5/2002 Lee et al.
10,687,553 B2 * 6/2020 Kaufman ............. A24B 15/167
(Continued)

FOREIGN PATENT DOCUMENTS

CN 1339674 A 3/2002
CN 108552613 A 9/2018
(Continued)

OTHER PUBLICATIONS

Machine translation of CN 108777863 A, European Patent Office,[online], retrieved from the internet,[retrieved Aug. 7, 2023], <URL: https://worldwide.espacenet.com/patent/search/family/064025543/publication/CN108777893A?q=CN108777893> (Year: 2023).*

(Continued)

*Primary Examiner* — Dennis R Cordray
(74) *Attorney, Agent, or Firm* — Sughrue Mion, PLLC

(57) ABSTRACT

According to an embodiment of the present invention, there is disclosed an aerosol-generating device for generating an aerosol through microwaves, the device including a microwave heater generating microwaves; a microwave cavity located in the aerosol-generating device, configured to accommodate a cigarette containing an aerosol-generating substrate, and including at least one outlet for passing an aerosol generated from the cigarette heated by the generated microwaves; and a microwave antenna located outside the microwave cavity and configured to transmit the generated microwaves to a predetermined effective area range in the microwave cavity.

13 Claims, 11 Drawing Sheets

(51) Int. Cl.

| | |
|---|---|
| ***A24F 40/53*** | (2020.01) |
| ***A24F 40/57*** | (2020.01) |
| ***H05B 6/72*** | (2006.01) |
| ***H05B 6/80*** | (2006.01) |
| *A24F 40/10* | (2020.01) |
| *A24F 40/30* | (2020.01) |

(52) U.S. Cl.

CPC ............... *H05B 6/72* (2013.01); *H05B 6/802* (2013.01); *A24F 40/10* (2020.01); *A24F 40/30* (2020.01); *H05B 2206/044* (2013.01)

(56) References Cited

U.S. PATENT DOCUMENTS

| | | | |
|---|---|---|---|
| 2002/0023922 A1 | 2/2002 | Lee et al. | |
| 2013/0334215 A1 | 12/2013 | Chen et al. | |
| 2016/0261020 A1 | 9/2016 | Marion et al. | |
| 2017/0086508 A1* | 3/2017 | Mironov | A24C 5/01 |
| 2018/0263290 A1 | 9/2018 | Collett et al. | |
| 2018/0271150 A1* | 9/2018 | Sparklin | A61M 15/0003 |
| 2018/0310622 A1 | 11/2018 | Mironov et al. | |
| 2020/0093185 A1 | 3/2020 | Lim | |

FOREIGN PATENT DOCUMENTS

| | | | |
|---|---|---|---|
| CN | 108777893 | A | 11/2018 |
| CN | 208624641 | U | 3/2019 |
| CN | 109567275 | A | 4/2019 |
| EP | 3 429 314 | A1 | 1/2019 |
| JP | 60-164797 | U | 11/1985 |
| JP | 2002-61847 | A | 2/2002 |
| JP | 2006-210132 | A | 8/2006 |
| JP | 2018-142452 | A | 9/2018 |
| KR | 10-2012-0103351 | A | 9/2012 |
| KR | 10-1707233 | B1 | 2/2017 |
| KR | 10-2018-0069895 | A | 6/2018 |
| KR | 10-2019-0017072 | A | 2/2019 |
| KR | 10-2019-0051745 | A | 5/2019 |
| KR | 1020200079694 | A | 7/2020 |
| WO | 2017/154712 | A1 | 9/2017 |
| WO | 2018/007938 | A1 | 1/2018 |
| WO | 2018/216961 | A1 | 11/2018 |
| WO | 2019/068664 | A1 | 4/2019 |

OTHER PUBLICATIONS

International Search Report for PCT/KR2020/006584 dated, Aug. 21, 2020.

Communication dated Sep. 13, 2022, from the Japanese Patent Office in Application No. 2020-543875.

Communication dated Jan. 7, 2021, from the Korean Intellectual Property Office in application No. 10-2019-0072430.

Communication dated Jul. 29, 2021, from the Korean Intellectual Property Office in application No. 10-2019-0072430.

Office Action dated Mar. 22, 2023 from the Chinese Patent Office in Application No. 202080002932.3.

Notification of Reasons for Refusal dated May 23, 2023 from the Japanese Patent Office in application No. 2020-543875.

Notice of Reasons for Refusal dated Oct. 26, 2021 from the Japanese Patent Office in JP Application No. 2020-543875.

Extended Search Report dated Nov. 4, 2021 from the European Patent Office in EP Application No. 20816084.6.

* cited by examiner

AEROSOL-GENERATING DEVICE FOR GENERATING AEROSOL THROUGH MICROWAVES AND METHOD THEREOF

TECHNICAL FIELD

The present invention relates to an aerosol-generating device and method of generating an aerosol through microwaves, and more particularly, to an aerosol-generating device capable of generating an aerosol by heating a cigarette containing an aerosol-generating substrate in a non-contact manner through microwaves, and a method for implementing the device.

BACKGROUND ART

Recently, the demand for alternative ways of overcoming the disadvantages of traditional cigarettes has increased. For example, there is growing demand for a method of generating aerosol by heating an aerosol-generating material in cigarettes, rather than by combusting cigarettes. Accordingly, research into a heating-type cigarette or a heating-type aerosol generator has been actively conducted.

In order to generate an aerosol in an aerosol-generating device, it is necessary that the aerosol-generating substrate is heated to or above a certain temperature by a heater for a certain time. In order for a cigarette for an aerosol-generating device containing an aerosol-generating substrate to be sufficiently heated in a non-contact manner, an efficient method is required. One of well-known methods uses an induction coil.

However, according to the method using an induction coil, there is a limitation in that the induction coil must be or above a certain size in order to have properties for heating the aerosol-generating substrate. Therefore, due to the size of the induction coil itself, it is difficult to miniaturize the aerosol-generating device using the induction coil.

DESCRIPTION OF EMBODIMENTS

Technical Problem

The technical problem to be solved by the present invention is to provide an aerosol-generating device for generating an aerosol by heating a cigarette of the aerosol-generating device through microwaves, and a method for implementing the device.

Solution to Problem

To solve the above technical problem, an aerosol-generating device for generating an aerosol through microwaves according to an embodiment of the present invention, the device may include a microwave generator generating microwaves; a microwave cavity located in the aerosol-generating device, configured to accommodate a cigarette containing an aerosol-generating substrate, and including at least one outlet for passing an aerosol generated from the cigarette heated by the generated microwaves; and a microwave antenna located outside the microwave cavity and transmitting the generated microwave to a predetermined effective area range in the microwave cavity.

To solve the above technical problem, a method of generating an aerosol through microwaves according to another embodiment of the present invention, the method may include generating microwaves; detecting that a cigarette containing an aerosol-generating substrate is inserted into a microwave cavity including at least one outlet for passing an aerosol generated from the cigarette; and transmitting, by a microwave antenna, the generated microwave to an effective area range of the microwave cavity, when it is detected that the cigarette is inserted into the microwave cavity.

One embodiment of the present invention discloses a computer-readable recording medium storing a program for executing the method.

Advantageous Effects of Disclosure

According to the present invention, it is possible to heat a cigarette through microwaves, and thus an induction coil can be excluded from the aerosol-generating device, thereby miniaturizing the aerosol-generating device.

In addition, even if the aerosol-generating device is not miniaturized, an internal space of the aerosol-generating device can be efficiently utilized, and the heat generated in the aerosol-generating device can be effectively lowered by securing an air gap inside the aerosol-generating device.

BEST MODE

Figure 1:
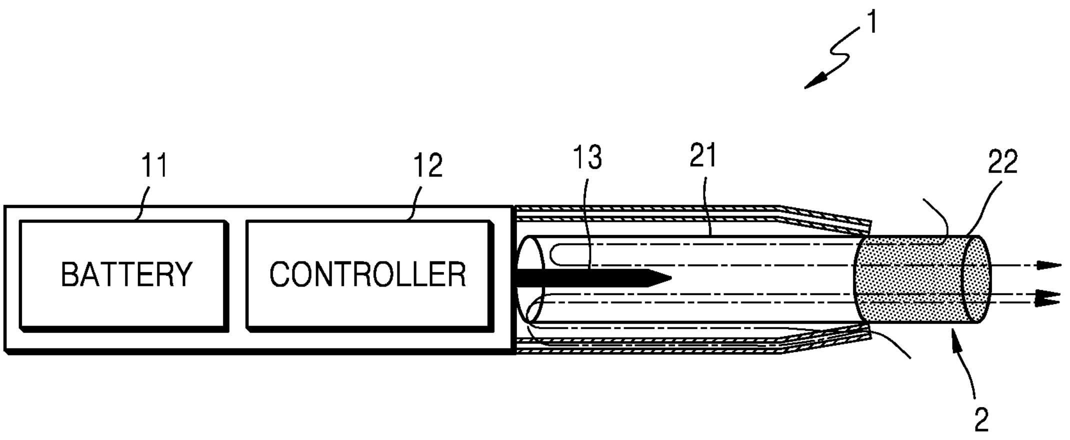
FIGS. 1 through 3 are diagrams showing examples in which a cigarette is inserted into an aerosol-generating device.

To solve the above technical problem, an aerosol-generating device for generating an aerosol through microwaves according to an embodiment of the present invention, the device may include a microwave generator generating microwaves; a microwave cavity located in the aerosol-generating device, configured to accommodate a cigarette containing an aerosol-generating substrate, and including at least one outlet for passing an aerosol generated by heating the cigarette through the generated microwaves; and a microwave antenna located outside the microwave cavity and configured to transmit the generated microwave to a predetermined effective area range in the microwave cavity.

In the device, the number of the microwave antenna may be at least two.

In the device, the microwave cavity may have a cylindrical shape with a cross-sectional area that narrows in an opposite direction to the direction in which the cigarette is inserted into the microwave cavity.

In the device, the microwave generator may include at least one magnetron.

In the device, the microwave generator may include at least one magnetron, and the microwave antenna may be installed in one-to-one correspondence with the at least one magnetron.

In the device, the microwave generator may include at least two magnetrons, and the magnetrons generate microwaves of different frequencies.

In the device, the microwave generator may include one magnetron, the microwave antenna includes at least two microwave antennas having different lengths.

In the device, the microwave antennas may include a first antenna and a second antenna, and the length of the first antenna is 1.5 times the length of the second antenna.

In the device, the microwave antenna may transmit the microwave so that microwaves transmitted from the microwave antenna are reflected at least twice within the microwave cavity.

To solve the above technical problem, a method of generating an aerosol through microwaves according to another embodiment of the present invention, the method may include generating microwaves; detecting that a cigarette containing an aerosol-generating substrate is inserted into a microwave cavity including at least one outlet for passing an aerosol generated from the cigarette; and transmitting, by a microwave antenna, the generated microwaves to an effective area range of the microwave cavity, when it is detected that the cigarette is inserted into the microwave cavity.

In the method, the number of the microwave antenna may be at least two.

In the method, the microwave cavity may have a cylindrical shape having a cross-sectional area that narrows in an opposite direction to the direction in which the cigarette is inserted into the microwave cavity.

In the method, the generating of microwaves may include generating the microwaves by at least one magnetron.

In the method, the generating of microwaves may include generating the microwaves by at least one magnetron, and the transmission of the generated microwaves may include transmitting the microwaves by the microwave antenna installed in one-to-one correspondence with the at least one magnetron.

In the method, the generating of microwaves may include generation of microwaves of different frequencies by at least two magnetrons.

In the method, the microwaves may have different frequencies and may be respectively generated by at least two different lengths.

In the method, the microwave antennas may include a first antenna and a second antenna, and the length of the first antenna is 1.5 times the length of the second antenna.

In the method, the transmitting of the generated microwaves may include transmitting the microwave such that the microwaves transmitted from the microwave antenna are reflected at least twice within the microwave cavity.

One embodiment of the present invention may provide a computer-readable recording medium storing a program for executing the method.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

The attached drawings for illustrating one or more embodiments are referred to in order to gain a sufficient understanding, the merits thereof, and the objectives accomplished by the implementation. The disclosure may, however, be embodied in many different forms and should not be construed as being limited to the embodiments set forth herein.

Hereinafter, embodiments of the present disclosure will be described in detail with reference to the drawings.

Figure 2:
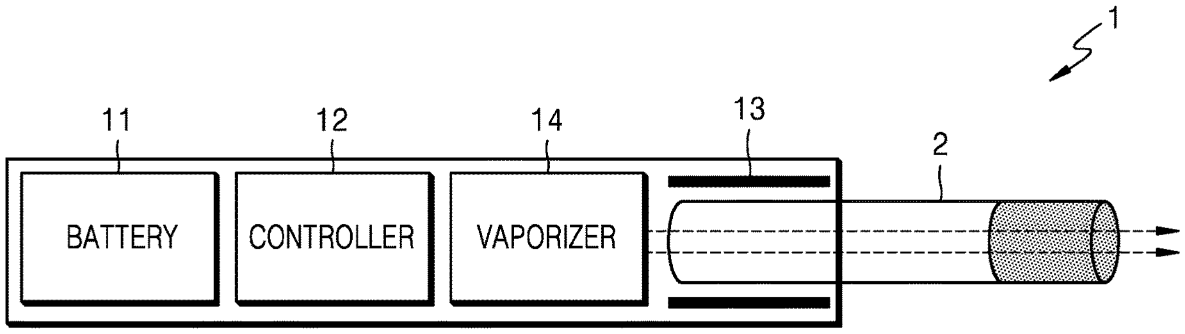
Figure 3:
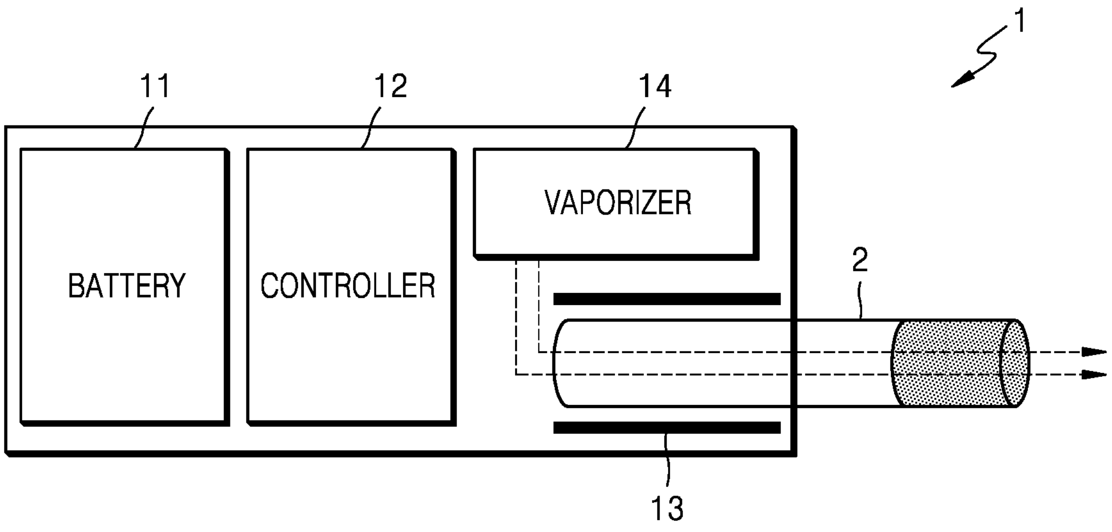

FIGS. 1 through 3 are diagrams showing examples in which a cigarette is inserted into an aerosol-generating device.

Referring to FIG. 1, an aerosol generating device 1 includes a battery 11, a controller 12, and a heater 13. Referring to FIGS. 2 and 3, the aerosol generating device 1 further includes a vaporizer 14. A cigarette 2 may be inserted into an internal space of the aerosol generating device 1.

The elements related to the embodiment are illustrated in the aerosol generator 1 of FIGS. 1 to 3. Therefore, one of ordinary skill in the art would appreciate that other universal elements than the elements shown in FIGS. 1 to 3 may be further included in the aerosol generator 1.

Although FIGS. 2 and 3 illustrate that the aerosol generator 1 includes the heater 13, the heater may be omitted as necessary.

In FIG. 1, the battery 11, the controller 12, and the heater 13 are arranged in a row. Also, FIG. 2 shows that the battery 11, the controller 12, the vaporizer 14, and the heater 13 are arranged in a row. Also, FIG. 3 shows that the vaporizer 14 and the heater 13 are arranged in parallel with each other. However, an internal structure of the aerosol generator 1 is not limited to the examples shown in FIGS. 1 to 3. That is, according to a design of the aerosol generator 1, arrangement of the battery 11, the controller 12, the heater 13, and the vaporizer 14 may be changed.

When the cigarette 2 is inserted into the aerosol generator 1, the aerosol generator 1 operates the heater 13 and/or the vaporizer 14 to generate aerosol from the cigarette 2 and/or the vaporizer 14. The aerosol generated by the heater 13 and/or the vaporizer 14 may be transferred to a user via the cigarette 2.

If necessary, even when the cigarette 2 is not inserted in the aerosol generator 1, the aerosol generator 1 may heat the heater 13.

The battery 11 supplies the electric power used to operate the aerosol generator 1. For example, the battery 11 may supply power for heating the heater 13 or the vaporizer 14 and supply power for operating the controller 12. In addition, the battery 11 may supply power for operating a display, a sensor, a motor, and the like installed in the aerosol generator 1.

The controller 12 controls the overall operation of the aerosol generator 1. In detail, the controller 12 may control operations of other elements included in the aerosol generator 1, as well as the battery 11, the heater 13, and the vaporizer 14. Also, the controller 12 may check the status of each component in the aerosol generator 1 to determine whether the aerosol generator 1 is in an operable state.

The controller 12 includes at least one processor. A processor can be implemented as an array of a plurality of logic gates or can be implemented as a combination of a general-purpose microprocessor and a memory in which a program executable in the microprocessor is stored. It will be understood by one of ordinary skill in the art that the present disclosure may be implemented in other forms of hardware.

The heater 13 may be heated by the electric power supplied from the battery 11. For example, when the cigarette is inserted in the aerosol generator 1, the heater 13 may be located outside the cigarette. Therefore, the heated heater 13 may raise the temperature of an aerosol generating material in the cigarette.

The heater 13 may be an electro-resistive heater. For example, the heater 13 includes an electrically conductive track, and the heater 13 may be heated as a current flows through the electrically conductive track. However, the heater 13 is not limited to the above example, and any type of heater may be used provided that the heater is heated to a desired temperature. Here, the desired temperature may be set in advance on the aerosol generator 1, or may be set by a user.

In addition, in another example, the heater 13 may include an induction heating type heater. In detail, the heater 13 may include an electrically conductive coil for heating the cigarette in an induction heating method, and the cigarette may include a susceptor that may be heated by the induction heating type heater.

For example, the heater 13 may include a tubular type heating element, a plate type heating element, a needle type heating element, or a rod type heating element, and may heat the inside or outside of the cigarette 2 according to the shape of the heating element.

Also, there may be a plurality of heaters 13 in the aerosol generator 1. Here, the plurality of heaters 13 may be arranged to be inserted into the cigarette 2 or on the outside of the cigarette 2. Also, some of the plurality of heaters 13 may be arranged to be inserted into the cigarette 2 and the other may be arranged on the outside of the cigarette 2. In addition, the shape of the heater 13 is not limited to the example shown in FIGS. 1 to 3, but may be manufactured in various shapes.

The vaporizer 14 may generate aerosol by heating a liquid composition and the generated aerosol may be delivered to the user after passing through the cigarette 2. In other words, the aerosol generated by the vaporizer 14 may move along an air flow passage of the aerosol generator 1, and the air flow passage may be configured for the aerosol generated by the vaporizer 14 to be delivered to the user through the cigarette.

For example, the vaporizer 14 may include a liquid storage unit, a liquid delivering unit, and a heating element, but is not limited thereto. For example, the liquid storage unit, the liquid delivering unit, and the heating element may be included in the aerosol generator 1 as independent modules.

The liquid storage unit may store a liquid composition. For example, the liquid composition may be a liquid including a tobacco containing material including a volatile tobacco flavor component, or a liquid including a non-tobacco material. The liquid storage unit may be attached to and detached from the vaporizer 14 or may be integrally manufactured with the vaporizer 14.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but is not limited thereto.

In addition, the aerosol generator 1 may further include universal elements, in addition to the battery 11, the controller 12, the heater 13, and the vaporizer 14. For example, the aerosol generator 1 may include a display capable of outputting visual information and/or a motor for outputting tactile information. In addition, the aerosol generator 1 may include at least one sensor (a puff sensor, a temperature sensor, a cigarette insertion sensor, etc.) Also, the aerosol generator 1 may be manufactured to have a structure, in which external air may be introduced or internal air may be discharged even in a state where the cigarette 2 is inserted.

Although not shown in FIGS. 1 to 3, the aerosol generator 1 may configure a system with an additional cradle. For example, the cradle may be used to charge the battery 11 of the aerosol generator 1. Alternatively, the heater 13 may be heated in a state in which the cradle and the aerosol generator 1 are coupled to each other.

The cigarette 2 may be similar to a traditional combustive cigarette. For example, the cigarette 2 may include a first portion containing an aerosol generating material and a second portion including a filter and the like. The second portion of the cigarette 2 may also include the aerosol generating material. For example, an aerosol-generating material made in the form of granules or capsules may be inserted into the second portion.

The entire first portion may be inserted into the aerosol generator 1 and the second portion may be exposed to the outside. Alternatively, only a portion of the first portion may be inserted into the aerosol generator 1 or the entire first portion and a portion of the second portion may be inserted into the aerosol generator 1. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generator 1. For example, opening and closing of the air passage formed in the aerosol generator 1 and/or the size of the air passage may be adjusted by a user. Accordingly, the amount and quality of the aerosol may be adjusted by the user. In another example, the outside air may be introduced into the cigarette 2 through at least one hole formed in a surface of the cigarette 2.

Hereinafter, an example of the cigarette 2 will be described with reference to FIGS. 4 and 5.

Figure 4:
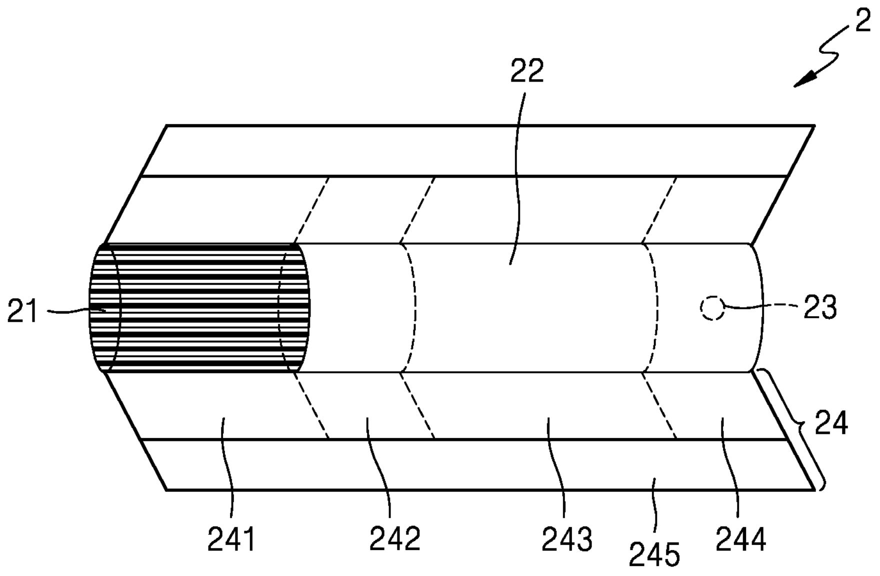
FIGS. 4 and 5 are diagrams showing examples of cigarettes.
Figure 5:
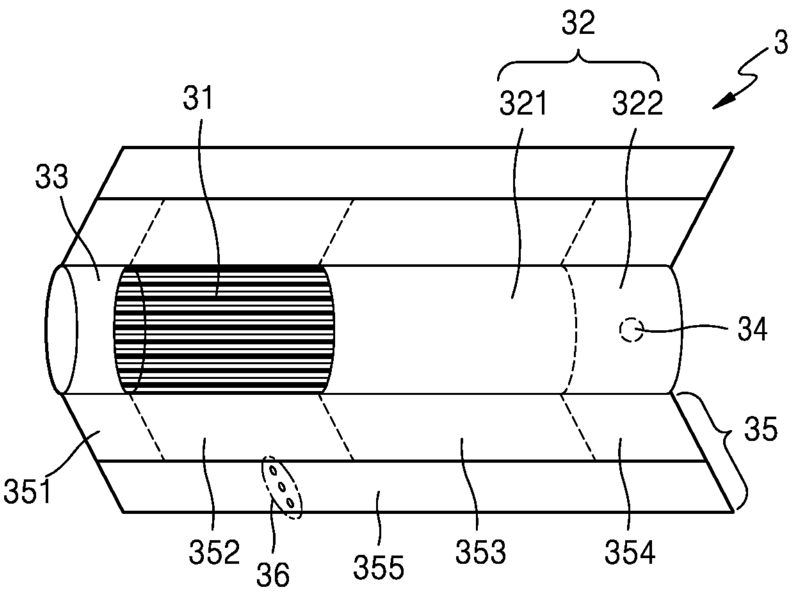

FIGS. 4 and 5 illustrate an example of a cigarette.

Referring to FIG. 4, the cigarette 2 includes a tobacco rod 21 and a filter rod 22. The first portion described above with reference to FIGS. 1 to 3 include the tobacco rod 21 and the second portion includes the filter rod 22.

In FIG. 4, the filter rod 22 is shown as a single segment, but is not limited thereto. In other words, the filter rod 22 may include a plurality of segments. For example, the filter rod 22 may include a first segment for cooling down the aerosol and a second segment for filtering a predetermined component included in the aerosol. Also, if necessary, the filter rod 22 may further include at least one segment performing another function.

The cigarette 2 may be packaged by at least one wrapper 24. The wrapper 24 may include at least one hole through which the outside air is introduced or inside air is discharged. For example, the cigarette 2 may be packaged by one wrapper 24. In another example, the cigarette 2 may be packaged by two or more wrappers 24. For example, the tobacco rod 21 may be packaged by a first wrapper 241, and the filter rod 22 may be packaged by wrappers 242 to 244. And the entire cigarette 2 may be packaged by another wrapper 245. When the filter rod 22 includes a plurality of segments, each segment may be packaged by separate wrappers 242, 243, and 244.

The tobacco rod 21 includes an aerosol generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 21 may include other additive materials like a flavoring agent, a wetting agent, and/or an organic acid. Also, a flavoring liquid such as menthol, humectant, etc. may be added to the tobacco rod 21 by being sprayed to the tobacco rod 21.

The tobacco rod 21 may be manufactured in various forms. For example, the tobacco rod 21 may be fabricated as a sheet or strands. Also, the tobacco rod 21 may be fabricated by tobacco leaves that are obtained by fine-cutting a tobacco sheet. Also, the tobacco rod 21 may be surrounded by a heat conducting material. For example, the heat-conducting material may be, but is not limited to, a metal foil such as aluminum foil. For example, the heat conducting material surrounding the tobacco rod 21 may improve a thermal conductivity applied to the tobacco rod by evenly dispersing the heat transferred to the tobacco rod 21, and thereby improving tobacco taste. Also, the heat conducting material surrounding the tobacco rod 21 may function as a susceptor that is heated by an inducting heating type heater. Although not shown in the drawings, the tobacco rod 21 may further include a susceptor, in addition to the heat conducting material surrounding the outside thereof.

The filter rod 22 may be a cellulose acetate filter. In addition, the filter rod 22 is not limited to a particular shape. For example, the filter rod 22 may be a cylinder type rod or a tube type rod including a cavity therein. Also, the filter rod 22 may be a recess type rod. When the filter rod 22 includes a plurality of segments, at least one of the plurality of segments may have a different shape from the others.

Also, the filter rod 22 may include at least one capsule 23. Here, the capsule 23 may generate flavor or may generate aerosol. For example, the capsule 23 may have a structure, in which a liquid containing a flavoring material is wrapped with a film. The capsule 23 may have a circular or cylindrical shape, but is not limited thereto.

Referring to FIG. 5, the cigarette 3 includes additionally a front-end plug 33. The front-end plug 33 may be located on a side of the tobacco rod 31 which does not face the filter rod 32. The front-end plug 33 may prevent the tobacco rod 31 from escaping to the outside and may prevent a liquefied aerosol from flowing from the tobacco rod 31 into an aerosol generating device (1 of FIGS. 1 to 3) during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and the total length of the cigarette 3 may correspond to the diameter and the total length of the cigarette 2 of FIG. 4.

The cigarette 3 may be wrapped by at least one wrapper 35. At least one hole through which outside air flows in or inside gas flows out may be formed in the wrapper 35. For example, the front-end plug 33 may be wrapped by a first wrapper 241 351, the tobacco rod 31 may be wrapped by a second wrapper 352, the first segment 321 may be wrapped by a third wrapper 353, and the second segment 322 may be wrapped by a fourth wrapper 354. Also, the entire cigarette 3 may be re-wrapped by a fifth wrapper 355.

Also, at least one perforation 36 may be formed in the fifth wrapper 355. For example, the perforation 36 may be formed in a region surrounding the tobacco rod 31, but is not limited thereto. The perforation 36 may serve to transfer heat generated by the heater 13 shown in FIGS. 2 and 3 into the tobacco rod 31.

Also, the second segment 322 may include at least one capsule 34. Here, the capsule 34 may serve to generate a flavor or serve to generate an aerosol. For example, the capsule 34 may have a structure in which a liquid containing perfume is wrapped in a film. The capsule 34 may have a spherical or cylindrical shape, but is not limited thereto.

Figure 6:
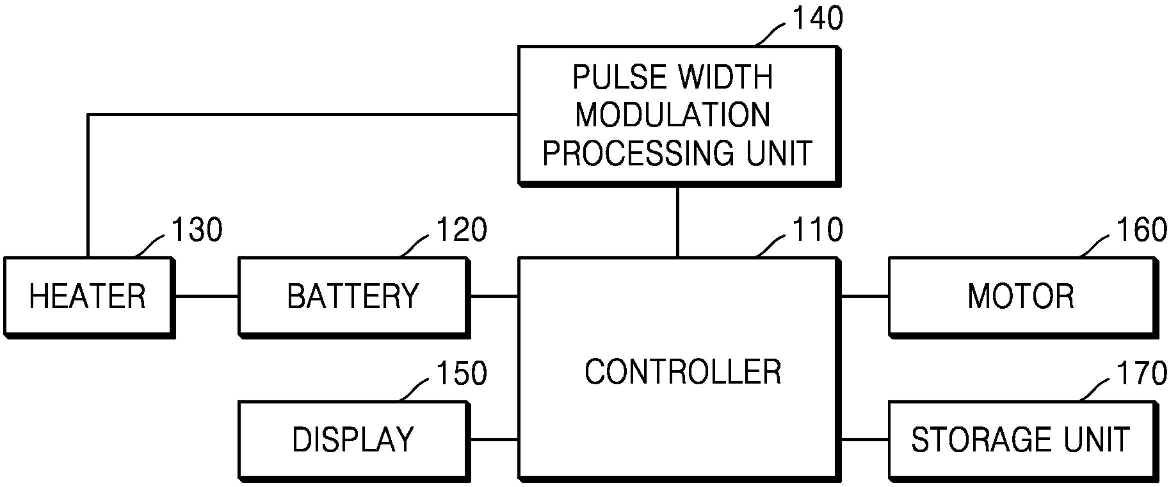
FIG. 6 is a diagram schematically illustrating a block diagram of an example of an aerosol-generating device according to the present invention.

FIG. 6 is a diagram schematically illustrating a block diagram of an example of an aerosol-generating device according to the present invention.

Referring to FIG. 6, the aerosol-generating device according to the present invention may include a controller 110, a battery 120, a heater 130, a pulse width modulation processing unit 140, a display 150, a motor 160, and a storage device (170). In FIG. 6, the controller 110, the battery 120, and the heater 130 are considered to correspond to the controller 12, the battery 11, and the heater 13 described in FIGS. 1 to 3, respectively.

The controller 12 controls overall operations of the battery 120, the heater 130, the pulse width modulation processing unit 140, the display 150, the motor 160, and the storage devices 170 included in the aerosol-generating device. Although not shown in FIG. 6, depending on an embodiment, the controller 110 may further include an input receiving unit (not shown) that receives a user's button input or touch input, and a communication unit (not shown) capable of communicating with an external communication device such as a user terminal. In addition, although not shown in FIG. 6, the controller 110 may further include a module for performing proportional integral differential control (PID) on the heater 130.

In particular, the controller 110, in addition to the overall control of the battery 120, the heater 130, the pulse width modulation processing unit 140, the display 150, the motor 160, and the storage devices 170 described above, may receive a result of detecting the strength change of the internal magnetic field of the aerosol-generating device from a plurality of geomagnetic sensors, detect in real time that a detachable element is detached from the aerosol-generating device, and provide an alarm to a user through the display 150 and the motor 160.

The battery 120 supplies power to the heater 130, and an amount of power supplied to the heater 130 may be adjusted by the controller 110.

The heater 130 generates heat by its specific resistance when a current is applied. When the aerosol-generating substrate is contacted to or is combined with the heated heater, aerosols may be generated.

The pulse width modulation processing unit 140 allows the controller 110 to control the power supplied to the heater 130 by transmitting Pulse Width Modulation (PWM) signals to the heater 130. Depending on an embodiment, the pulse width modulation processing unit 140 may be implemented to be included in the controller 110.

The display 150 visually outputs various alarm messages generated by the aerosol-generating device 1 so that a user using the aerosol-generating device 10 may check the alarm messages. The user may check a battery power shortage message or a heater overheat warning message output to the display 150, and then may take appropriate measures before an operation of the aerosol-generating device stops or the aerosol-generating device is damaged.

The motor 160 is driven by the controller 110 so that the user may recognize that the aerosol-generating device is ready for use through tactile sense.

The storage device 170 stores various pieces of information to provide a consistent flavor to the user who uses the aerosol-generating device while appropriately controlling a power supplied to the heater 130 by the controller 110. For example, information stored in the storage device 170 includes a temperature profile which is referenced by the controller 110 to appropriately control the temperature of the heater over time, a control reference ratio to be described later, and a comparison control value. The storage device 170 may store the temperature profile, the control reference ratio, and the comparison control value in advance, and then transmit the information to the controller 110 at the request of the controller 110. The storage device 170 may not only be configured as a non-volatile memory, such as a flash memory, but also may be configured as a volatile memory that temporarily stores data only when power is supplied in order to secure a faster data input/output (I/O) speed.

The controller 110, the pulse width modulation processing unit 140, the display 150, and the storage device 170 may correspond to at least one processor or may include at least one processor, according to an embodiment the present invention. Accordingly, the controller 110, the pulse width modulation processing unit 140, the display, and the storage device 170 may be driven in a form included in other hardware device such as a microprocessor or general purpose computer system.

Figure 7:
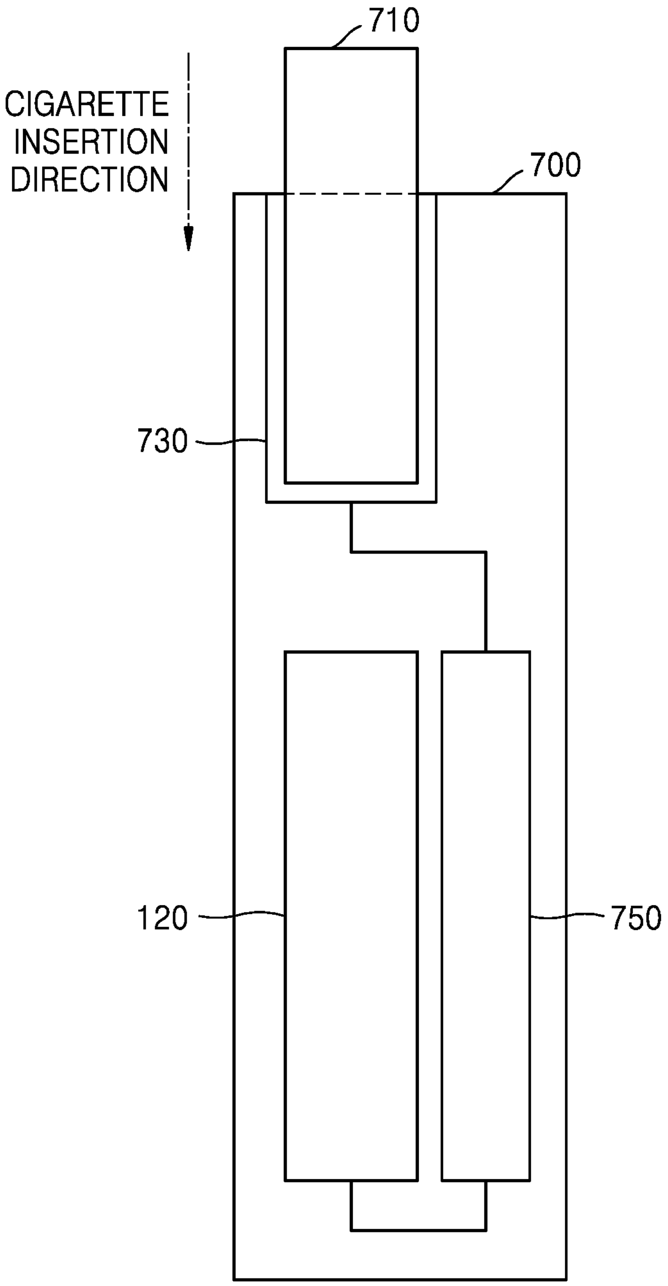
FIG. 7 is a block diagram of another example of an aerosol-generating device according to the present invention.

FIG. 7 is a block diagram of another example of an aerosol-generating device according to the present invention.

More specifically, FIG. 6 is a conceptual block diagram for explaining various components included in the aerosol-generating device according to an embodiment, while FIG. 7 only shows certain components which are particularly relevant to a method for generating an aerosol through microwaves according to an embodiment, and other components are omitted.

Referring to FIG. 7, the aerosol-generating device 700 according to the present invention includes a cigarette 710, a microwave cavity 730, a microwave generating device 750, and a battery 120. Hereinafter, the aerosol-generating device 700 in FIG. 7 is regarded as an example of the aerosol-generating device 1 described in FIGS. 1 to 6.

First, the battery 120 performs a function of supplying power to various components included in the aerosol-generating device 700 in the same manner as the battery 120 described in FIG. 6 does.

The cigarette 710 is inserted into the microwave cavity 730 in the cigarette insertion direction as shown in FIG. 7, and heated by the microwave, thereby generating an aerosol. In more detail, after the cigarette 710 is inserted into the microwave cavity 730 by a predetermined depth or more in a predetermined cigarette insertion direction, microwaves may be generated by the microwave generator 750. Such a control method makes it possible to prevent microwaves from being generated unnecessarily in a state where the cigarette 710 is not inserted into the microwave cavity 730 and being transmitted to the microwave cavity 730.

The microwave cavity 730 is manufactured to have a predetermined volume, and surrounds the cigarette 710 inserted into the aerosol-generating device 1. The microwave cavity 730 receives microwaves transmitted from the microwave generator 750 and induces at least one reflection on the inner wall of the microwave cavity 730, so that the cigarette 710 inserted in the microwave cavity 730 may be heated by the reflected microwave. The microwave cavity 730 is designed to include at least one outlet in the direction in which the cigarette 710 is inserted, so that the aerosol generated in the aerosol-generating device 1 due to inhalation of the user may be discharged through the outlet.

Although not shown in FIG. 7, the microwave cavity 730 checks whether the cigarette 710 is properly inserted in the cigarette insertion direction, or checks whether the cigarette 710 is compatible with the aerosol-generating device 1 by sensing the properties of a wrapping paper attached to the cigarette 710, a material of the outer portion of the wrapping paper, or printed patterns. The microwave cavity 730 may itself include one or more sensors to implement the above-described functions.

The microwave generator 750 is connected to the battery 120 to receive power and generates microwaves, and transmits the generated microwaves to the microwave cavity 730. The microwave generating device 750 may include a magnetron for generating microwaves, a controller for controlling the power supply of the battery 120 to the magnetron, and a microwave antenna for transmitting the microwave generated by the magnetron to the microwave cavity 730, which will be described later with reference to FIG. 8.

The overall operation of the aerosol-generating device 700 according to the present invention may be summarized as follows. First, in a state where the power of the aerosol-generating device 700 is turned on, the cigarette 710 is completely mounted in the microwave cavity 730. Here, the sensor attached to the microwave cavity 730 detects whether the cigarette 710 is completely mounted in the microwave cavity 730 of the aerosol-generating device 700 enough to generate an aerosol, and transmits the detected result to the microwave generating device 750.

When the cigarette 710 is completely mounted in the microwave cavity 730, the microwave generator 750 may activate power supply of the battery 120 to the magnetron according to a user input. The magnetron supplied with the power of the battery 120 generates microwaves, and the generated microwaves are transmitted to the microwave cavity 730 through the microwave antenna and penetrate into the cigarette 710. And the microwave heats the cigarette 710 while being reflected several times by the inner wall of the microwave cavity 730. In this process, the microwave not only continues to be reflected by the inner wall of the microwave cavity 730, but also is scattered reflected by various moisturizers, shredded tobacco leaves which constitute the cigarette 710, and the like. When an aerosol is generated from the cigarette 710 heated to or above a predetermined temperature by the microwave, a user may recognize that the aerosol has been generated through an LED (not shown) or a vibration motor (160 in FIG. 6) provided in the aerosol-generating device 700, and puff the aerosol.

Figure 8:
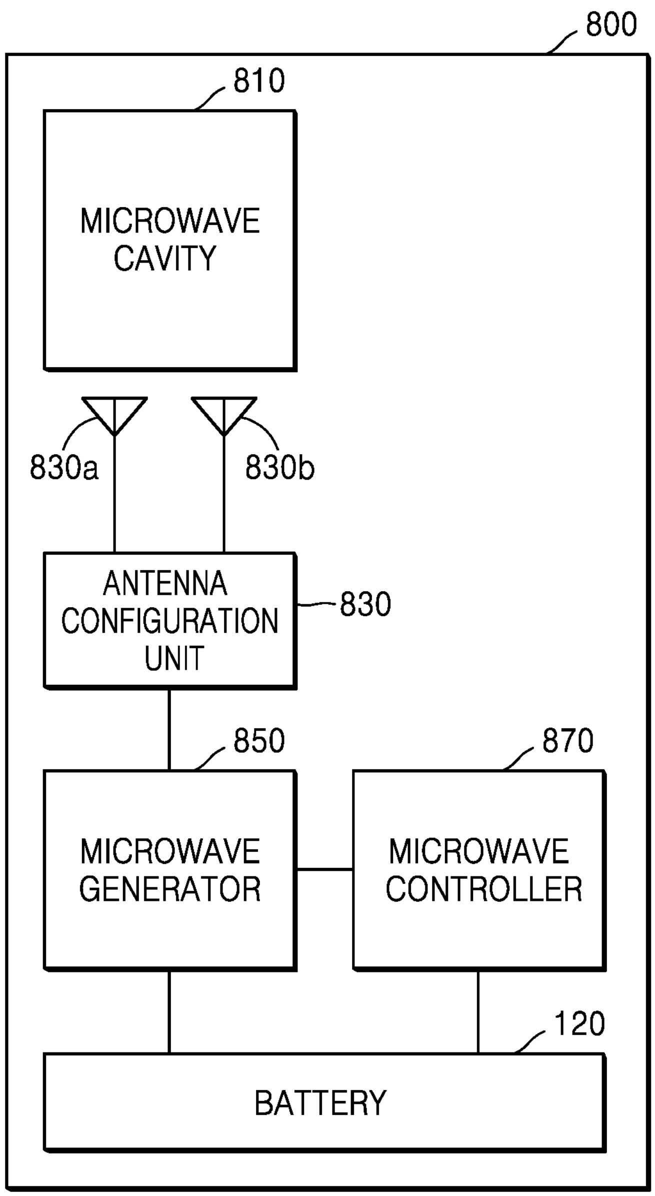
FIG. 8 is a block diagram illustrating another example of an aerosol-generating device according to the present invention.

FIG. 8 is a block diagram illustrating another example of an aerosol-generating device according to the present invention.

Referring to FIG. 8, the aerosol-generating device 800 may include a microwave cavity 810, microwave antennas 830*a* and 830*b*, an antenna configuration unit 830, a microwave generator 850, a microwave controller 870 and the battery 120. Referring to FIG. 8 in comparison with FIG. 7, the microwave generating device 750 of FIG. 7 is subdivided into microwave antennas 830*a* and 830*b*, an antenna configuration unit 830, a microwave generator 850, and a microwave controller 870 in FIG. 8.

The microwave cavity 810 performs the same function as that described in FIG. 7, and the cigarette inserted into the microwave cavity 810 is omitted in FIG. 8 to increase visibility of the drawing.

The microwave antennas 830*a* and 830*b* transmit the microwaves generated by the microwave generator 850 to the microwave cavity 810. Although two microwave antennas 830*a* and 830*b* are shown in FIG. 8, the number of microwave antennas may be more than two.

The antenna configuration unit 830 receives microwaves from the microwave generator 850, loads the microwaves on the microwave antennas 830*a* and 830*b*, and transmits the loaded microwaves to the microwave cavity 810. In addition, the antenna configuration unit 830 may adjust the number of antennas transmitting microwaves. For example, the antenna configuration unit 830 may additionally install a third microwave antenna (not shown) in addition to the first microwave antenna 830*a* and the second microwave antenna 830*b* shown in FIG. 8, and may control the microwave to be transmitted to the microwave cavity 810 through the first microwave antenna 830*a* to the third microwave antenna (not shown).

The microwave generator 850 receives power from the battery 120 to generate microwaves. The microwave generator 850 may include a magnetron for generating microwaves. The microwave generator 850 may be referred to as a microwave heater according to an embodiment.

In an embodiment, the microwave generator 850 may include at least two different magnetrons, and different magnetrons may be designed to generate microwaves of different frequencies. The microwave generator 850 may include the magnetron in the form of an IC chipset including the magnetron. For example, the microwave generator 850 includes two magnetrons, which generate microwaves of 2.5 GHz and 2.7 GHz, respectively, and transmits the generated microwaves through two microwave antennas, respectively. Herein, the microwave antennas 830*a* and 830*b* may be installed in one-to-one correspondence with the at least one magnetron. When a microwave with a specific frequency is generated in each magnetron, a microwave may be transmitted to the microwave cavity 810 through the corresponding microwave antenna.

The microwave controller 870 controls the power of the battery 120 supplied to the microwave generator 850, thereby controlling generation of the microwave. In FIG. 8, the antenna configuration unit 830, the microwave generator 850, and the microwave controller 870 are located outside the microwave cavity 810.

Figure 9:
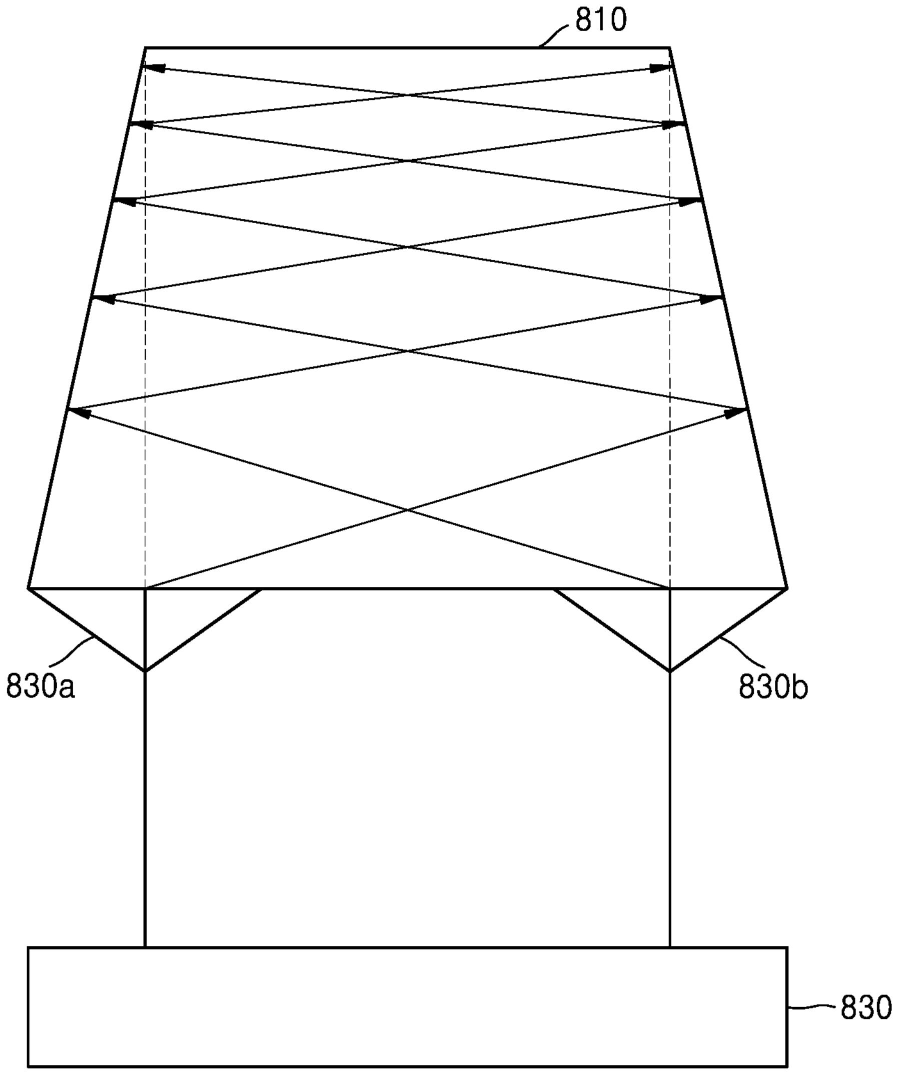
FIG. 9 is a diagram schematically showing an example in which an aerosol is generated by using a plurality of microwave antennas in an aerosol-generating device of the present invention.

FIG. 9 is a diagram schematically showing an example in which an aerosol is generated by using a plurality of microwave antennas in an aerosol-generating device of the present invention.

In FIG. 9, for convenience of description, a cigarette is omitted. Also, the microwave cavity 810, the first microwave antenna 830*a*, the second microwave antenna 830*b*, and the antenna configuration unit 830 are only illustrated, and other components described in FIG. 8 are omitted. Hereinafter, it will be described with reference to FIG. 8.

In FIG. 9, the microwave antenna only includes the first microwave antenna 830*a* and the second microwave antenna 830*b*, but it is apparent to those skilled in the art that the number of microwave antennas may be three or more, depending on the embodiment.

As described with reference to FIG. 8, in the present invention, when microwaves are generated by the microwave generator 850 located outside the microwave cavity 810, the microwaves are transmitted to the interior of the microwave cavity 810 through at least two microwave antennas. Herein, the first microwave antenna 830*a* and the second microwave antenna 830*b* may be arranged or set so that the microwave is transmitted to a predetermined effective area range of the microwave cavity 810.

As shown in FIG. 9, the microwave cavity 810 may have a cylindrical shape with a cross-sectional area that narrows in an opposite direction to the direction in which a cigarette is inserted into the microwave cavity 810. Due to the microwave cavity 810 having the shape shown in FIG. 9, it is possible to minimize the chance that the microwave transmitted from the microwave antenna exits through the outlet of the microwave cavity 810 directly without being reflected on the inner wall of the microwave cavity 810. As an example opposite to that shown in FIG. 9, the microwave cavity 810 may have a cylindrical shape with a cross-sectional area that narrows in the direction in which the cigarette is inserted into the microwave cavity 810. As another method for preventing microwaves from exiting through the outlet of the microwave cavity 810, a shield may be inserted into a filter portion of the cigarette.

Preferably, the number of microwave antennas that transmit microwaves to the microwave cavity 810 may be two or more. As shown in FIG. 9, when two microwave antennas are installed, it is preferable that the first microwave antenna 830*a* and the second microwave antenna 830*b* are installed at a distance from the center of the cross section of the microwave cavity 810 in order to sufficiently increase the number of reflections of the microwave, so that the microwaves are reflected at least twice inside the microwave cavity 810.

The antenna configuration unit 830 receives the microwave from the microwave generator 850, and transmits the received microwave to a predetermined effective area range of the microwave cavity 810 through the first microwave antenna 830_a_ and the second microwave antenna 830_b_. Herein, the predetermined effective area range refers to a specific area inside the microwave cavity 810 in which the microwaves must be transmitted in order to efficiently heat the aerosol-generating substrate of the cigarette by the microwave.

For example, when the microwave transmitted from the first microwave antenna 830_a_ proceeds toward the outlet through which the aerosol passes, the microwave is not reflected at all. In this case, the aerosol-generating substrate contained in the cigarette may not be effectively heated. As another example, even when the microwave transmitted from the second microwave antenna 830_b_ transmits toward other components included in the aerosol-generating device, not inside the microwave cavity 810, the microwave transmitted from the antenna does not contribute to raising the temperature of the aerosol-generating substrate contained in the cigarette.

That is, in order to generate an aerosol, the microwave transmitted from the microwave antennas 830_a_ and 830_b_ should be transmitted to a suitable area inside the microwave cavity 810 so as to properly heat the aerosol-generating substrate contained in the cigarette while being properly reflected in the microwave cavity 810. The area to which the microwave is to be transmitted is set in advance as a preset effective area range. For example, the effective area range may be all or part of the surface area of the side surface of the cylindrical microwave cavity 810.

The use of at least two microwave antennas in the present invention is related to a vaporization temperature of glycerin, which is one of aerosol-generating substrates, and a depth of penetration of a microwave into an aerosol-generating substrate contained in a cigarette.

First, the cigarette contain a moisturizing agent, glycerin, etc., as well as shredded tobacco leaves as an aerosol-generating substrate. When the specific heat of water is 1, the specific heat of glycerin is measured to about 0.6 at room temperature. Here, the vaporization temperature of glycerin is about 290 degrees, and the heat required to vaporize 1 g of glycerin may be calculated to about 174 cal. The output power of the magnetron chip included in the aerosol-generating device according to the present invention is about 190 W when 30 V is supplied. However, if the voltage of the battery 120 included in the aerosol-generating device is increased to 30V, excessive power loss may occur. Therefore, assuming that the voltage of the battery is only about 15V, at least two microwave antennas are required to transmit microwaves capable of stably vaporizing glycerin.

In addition, in the case of a microwave of a frequency of 2.5 GHz used in a home microwave oven, to overcome a problem that the heating object is not evenly heated, microwave ovens are provided with a rotating plate so that the microwave is evenly absorbed by the heating object. However, such a method cannot be adopted in the aerosol-generating device because it is practically difficult to rotate the cigarette. In the present invention, a plurality of microwave antennas are arranged in order to uniformly heat the cigarette to be heated. According to an embodiment, the frequency of the microwaves transmitted by the microwave antenna may be different for each microwave antenna, and it has been described that at least two magnetrons may be provided in order to implement the present embodiment.

As an optional embodiment, the microwave generator 850 may include at least one magnetron, and the microwave antenna may be installed inside the aerosol-generating device in one-to-one correspondence with the magnetron. In this case, the microwave generated from a first magnetron may be transmitted through the first microwave antenna 830_a_, the microwave generated from a second magnetron may be transmitted through the second microwave antenna 830_b_, and the microwaves generated by the magnetrons may have different frequencies.

Figure 10:
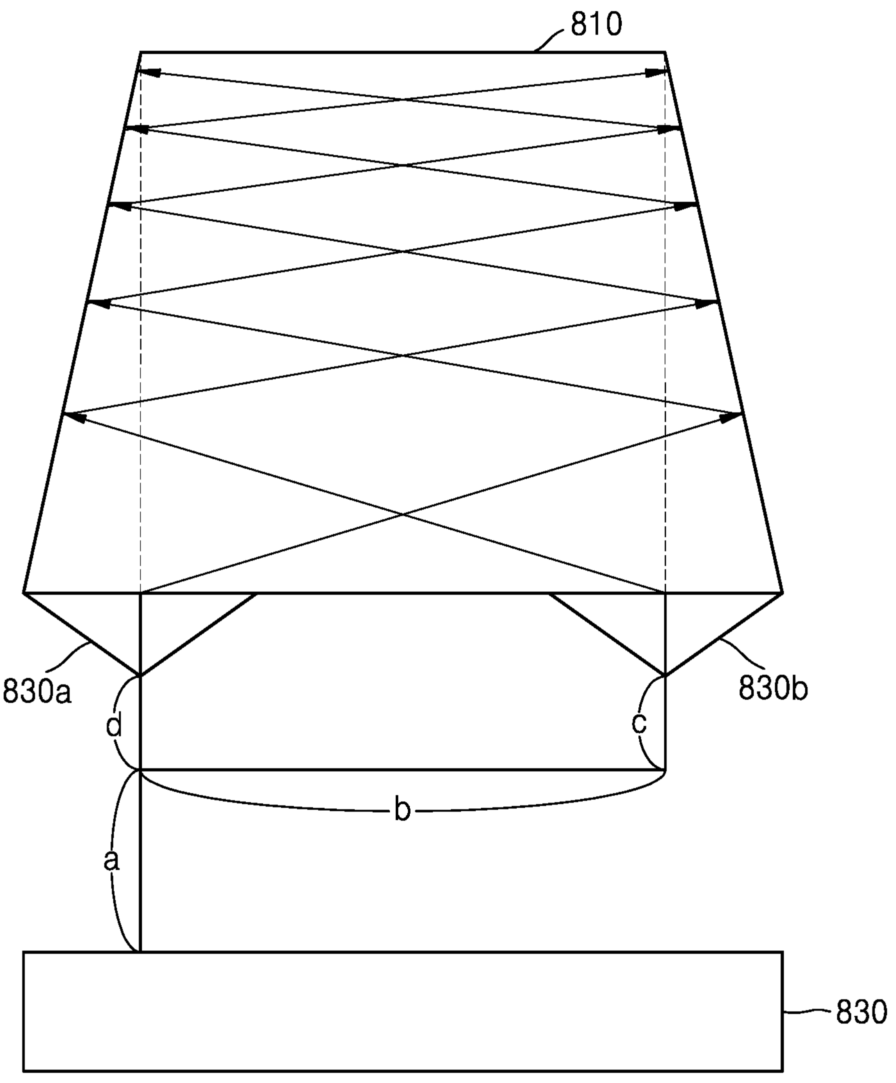
FIG. 10 is a diagram schematically showing another example in which an aerosol is generated by using a plurality of microwave antennas in an aerosol-generating device of the present invention.

FIG. 10 is a diagram schematically showing another example in which an aerosol is generated by using a plurality of microwave antennas in an aerosol-generating device of the present invention.

In FIG. 10, for convenience of description, a cigarette is omitted. Also, the microwave cavity 810, the first microwave antenna 830_a_, the second microwave antenna 830_b_, and the antenna configuration unit 830 are only illustrated, and other components described in FIG. 8 are omitted. Hereinafter, it will be described with reference to FIG. 8. In FIG. 9, the microwave antenna only includes the first microwave antenna 830_a_ and the second microwave antenna 830_b_, but it is apparent to those skilled in the art that the number of microwave antennas may be three or more, depending on the embodiment.

FIG. 10 is similar to that described in FIG. 9 in that a plurality of microwave antennas are used. However, FIG. 10 is different from FIG. 9 in that there is a single magnetron and the microwave antenna is modified to heat the inside of the cigarette inserted in the microwave cavity 810 to various penetration depths.

In more detail, in FIG. 10, at the output terminal of the antenna configuration unit 830, there is only one microwave antenna provided in the antenna configuration unit 830. Also, a large microwave antenna in FIG. 10 includes a first microwave antenna 830_a_ and a second microwave antenna 830_b_. The present optional embodiment schematically describes a method of controlling the output frequency of the microwave based on the length of the antenna at one output terminal. This embodiment is based on the idea that microwaves of different frequencies may be obtained by differentiating the length of an antenna transmitting microwaves, even if the microwaves are generated from the same magnetron.

The method for measuring the length of the antenna affecting the frequency of the microwave are as follows. First, the length of the first microwave antenna 830_a_ is a+d. Similarly, the length of the second microwave antenna 830_b_ is a+b+c.

$$k = \frac{a+b+c}{a+d} \quad \text{[Equation 1]}$$

Equation 1 represents an equation for calculating k, which is a ratio between the length of the first microwave antenna 830_a_ and the length of the second microwave antenna 830_b_. In Equation 1, k is a ratio of the length of the second microwave antenna 830_b_ to the length of the first microwave antenna 830_a_, and a to d are numerical values for calculating the length of the first microwave antenna 830_a_ or the length of the second microwave antenna 830_b_ in FIG. 10. For example, when the length of the second microwave antenna 830_b_ is 15 and the length of the first microwave antenna 830_a_ is 10, k is 1.5, and a value corresponding to 1.5 may act as a parameter that changes the frequency of the microwave. That is, as the value of k increases, the frequency difference between microwaves transmitted from the two antennas increases. According to the above example, the microwaves transmitted from the first microwave antenna 830_a_ and the second microwave antenna 830_b_ have different frequencies due to the antenna length ratio k, despite being generated from the same magnetron.

According to this exemplary embodiment, different antenna outputs may be made from a single microwave output terminal by adjusting the length of the antenna, and it is possible to output a plurality of microwaves of various frequencies in proportion to the number of antennas. As such, it is possible to heat the inside of the cigarette more easily and efficiently. In addition, depending on the embodiment, k may be a value other than 1.5 described above.

Figure 11:
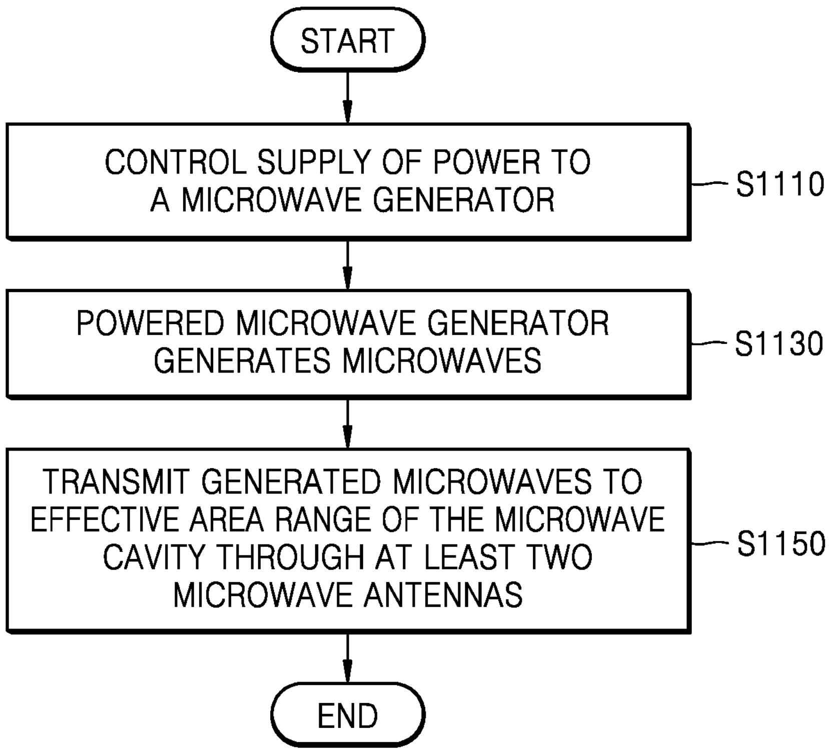
FIG. 11 is a flowchart illustrating an example of a method of generating an aerosol through microwaves according to the present invention.

FIG. 11 is a flowchart illustrating an example of a method of generating an aerosol through microwaves according to the present invention.

Since the aerosol generating method illustrated in FIG. 11 may be implemented by the aerosol-generating device illustrated in FIG. 7 or 8, hereinafter, it will be described with reference to FIG. 7 or 8, and descriptions overlapping with those described in FIGS. 7 and 8 will be omitted.

First, a microwave controller 870 detects that the power of the aerosol-generating device 800 is turned on after a battery 120 is mounted, and controls supply of power to a microwave generator 850 (S1110). In step S1110, the microwave controller 870 may determine whether a cigarette suitable for proceeding to the next step is inserted into a microwave cavity 810 of an aerosol-generating device 800.

The microwave generator 850 is supplied with power from the battery 120 under the control of the microwave controller 870 and generates microwaves (S1130).

The microwave antenna transmits the microwave generated in step S1130 to the effective area range of the microwave cavity (S1150).

According to the present invention, as the cigarette can be heated through the microwave, an induction coil can be excluded from the aerosol-generating device, and thus the aerosol-generating device can be miniaturized.

In addition, even if the aerosol-generating device is not miniaturized, an internal space of the aerosol-generating device can be efficiently utilized, and the heat generated in the aerosol-generating device can be effectively lowered by securing an air gap inside the aerosol-generating device.

The embodiments of the present disclosure may be implemented in the form of a computer program which may be executed on a computer via various types of components, and such a computer program may be recorded on a computer-readable recording medium. The medium may include a magnetic medium such as a hard disk, a floppy disk, and a magnetic tape, an optical recording medium such as CD-ROM and DVD, a magneto-optical medium such as a floptical disk, and a hardware device specifically configured to store and execute program instructions, such as ROM, RAM, and flash memory.

The computer program is specifically designed and configured for the present disclosure but may be known to and used by one of ordinary skill in the computer software field. Examples of the computer program may include a high-level language code which may be executed using an interpreter or the like by a computer, as well as a machine language code such as that made by a complier.

The specific implementations described in the present disclosure are example embodiments and do not limit the scope of the present disclosure in any way. For brevity of the specification, descriptions of existing electronic configurations, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of the present disclosure.

As used herein (in particular, in claims), use of the term "the" and similar indication terms may correspond to both singular and plural. When a range is described in the present disclosure, the present disclosure may include the invention to which individual values belonging to the range are applied (unless contrary description), and each individual value constituting the range is the same as being described in the detailed description of the disclosure. Unless there is an explicit description of the order of the steps constituting the method according to the present disclosure or a contrary description, the steps may be performed in an appropriate order. The present disclosure is not necessarily limited to the description order of the steps. The use of all examples or example terms (for example, etc.) is merely for describing the present disclosure in detail, and the scope of the present disclosure is not limited by the examples or the example terms unless the examples or the example terms are limited by claims. It will be understood by one of ordinary skill in the art that various modifications, combinations, and changes may be made according to the design conditions and factors within the scope of the appended claims or equivalents thereof

What is claimed is:

1. An aerosol-generating device for generating an aerosol through microwaves, the aerosol-generating device comprising:
- a microwave generator configured to generate microwaves;
- a microwave cavity located in the aerosol generating device, configured to accommodate a cigarette containing an aerosol-generating substrate, and comprising at least one outlet for passing an aerosol generated from the cigarette being heated by the generated microwaves; and
- at least two microwave antennas located outside the microwave cavity and configured to transmit the generated microwaves to a predetermined effective area range in the microwave cavity,
- wherein the at least two microwave antennas have different lengths.

2. The aerosol-generating device of claim 1, wherein the microwave cavity has a cylindrical shape having a cross-sectional area that narrows in an opposite direction to the direction in which the cigarette is inserted into the microwave cavity.

3. The aerosol-generating device of claim 1, wherein the microwave generator includes at least one magnetron.

4. The aerosol-generating device of claim 1, wherein
- the microwave generator includes at least two magnetrons, and
- the at least two microwave antenna is antennas are installed in one-to-one correspondence with the at least two magnetrons.

5. The aerosol-generating device of claim 4, wherein
- the at least two magnetrons generate microwaves of different frequencies.

6. The aerosol-generating device of claim 1, wherein
- the microwave generator includes one magnetron.

7. The aerosol-generating device of claim 6, wherein
- the at least two microwave antennas include a first antenna and a second antenna, and a length of the first antenna is 1.5 times a length of the second antenna.

8. The aerosol-generating device of claim 1, wherein the at least two microwave antennas transmit the microwaves such that the microwaves transmitted from the at least two microwave antennas are reflected at least twice within the microwave cavity.

9. A method of generating an aerosol through microwaves, the method comprising:

generating microwaves;

detecting that a cigarette containing an aerosol-generating substrate is inserted into a microwave cavity including at least one outlet for passing an aerosol generated from the cigarette; and transmitting, by at least two microwave antennas having different lengths, the generated microwaves to an effective area range of the microwave cavity, when it is detected that the cigarette is inserted into the microwave cavity.

10. The method of claim 9, wherein the microwave cavity has a cylindrical shape having a cross-sectional area that narrows in an opposite direction to the direction in which the cigarette is inserted into the microwave cavity.

11. The method of claim 9, wherein the generating of microwaves includes generating the microwaves by at least one magnetron.

12. The method of claim 9, wherein the generating of microwaves includes generating the microwaves by at least two magnetrons, and the transmitting of the generated microwaves includes transmitting the microwaves by the at least two microwave antennas installed in one-to-one correspondence with the at least two magnetrons.

13. The method of claim 9, wherein the microwaves have different frequencies and are respectively generated by at least two magnetrons.

* * * * *